UNITED STATES PATENT OFFICE 2,036,525

IMIDAZOLE SULPHONIC ACIDS USEFUL AS TEXTILE ASSISTING AGENTS AND PROCESS OF MAKING SAME

Charles Gränacher, Basel, Switzerland, assignor to firm Society of Chemical Industry in Basle, Basel, Switzerland No Drawing. Application April 20, 1933, Serial No. 667,133. In Switzerland April 27, 1932

16 Claims. (Cl. 260—44)

The present invention relates to the production of new textile auxiliaries being sulphonic acids of the imidazole series, and comprises the method of producing same, as well as the new products themselves.

According to this invention new products which are valuable as assisting agents are made by converting into a water-soluble compound by treatment with a sulphonating agent a cyclic amidine which on the one hand is derived from an ortho- or 1:8-arylene-diamine and on the other hand is substituted at the $\mu$-carbon atom by an aliphatic or hydroaromatic residue containing at least 3 carbon atoms. Such water-soluble products are likewise obtained by subjecting such a cyclic amidine both to exhaustive alkylation, aralkylation or arylation and to sulphonation. If required sulphonation may occur after previous partial alkylation or aralkylation.

The new products are thus water-soluble sulphonated derivatives of the cyclic amidines of the general formula

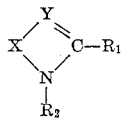

wherein the symbols used have the following significations:— Y stands for a nitrogen atom which, due to the addition of a compound of the type halogen-Z (wherein Z means alkyl, aralkyl, or aryl), may be present in the form of the pentavalent nitgrogen atom of a quaternary ammonium compound, X stands for a ring of the benzene or naphthalene series which contains at least one sulphonic group, and which further is directly linked up with the nitrogen atoms Y and N by two vicinal carbon atoms, $R_1$ stands for a non-aromatic radicle consisting itself of at least 3 carbon atoms, and $R_2$ stands for a hydrogen atom or an alkyl, aralkyl or aryl radicle. These products, in the form of the salts which they form with alkalies, constitute colorless to light colored powders which dissolve in water to form solutions having strong capillary active properties. The term capillary active is understood to mean here both the diminished surface tension of the solutions, and their dispersing, emulsifying and cleansing capacity.

The new products form with bases salts whose aqueous solutions have a remarkable effect in promoting washing, emulsification, levelling, dispersion and wetting. They are thus applicable as valuable assistants in the textile industry as well as in all other branches of industry in which such auxiliaries are used. Some of the products obtainable by the invention have still other properties. Finally a number of the new products can be used for the production of softening agents.

As cyclic amidines suitable as parent materials for the invention there may be named quite generally the imidazoles or perimidines, including those substituted in the NH-group by alkyl aralkyl or aryl residues, which are obtainable from ortho-phenylenediamine or its homologues or analogues, such as ortho-toluylene-diamine, ortho-chlorinated-phenylene-diamines, ortho-nitraniline, ortho-amino-diphenylamines, ortho-aminomono-methylaniline, ortho-naphthylene-diamines, and from aliphatic acids, such as butyric acid, caproic acid, caprylic acid, capric acid, lauric acid, arachic acid, cerotic acid or the like, or from a naphthenic acid or from mixtures of suitable acids.

For the sulphonation there may be used chlorosulphonic acid, sulphuric acid or sulphuric acid containing sulphur-trioxide. The alkylation, aralkylation or arylation, or the exhaustive alkylation or aralkylation, is advantageously brought about by treatment with suitable alkylating, aralkylating or arylating agents; examples of such agents are benzylchloride, chloromethyl-naphthalene and derivatives thereof, alkyl-halides, halogen alkyl-sulphonic acids, chlorhydrins, epichlorhydrins, alkyl-sulphates and dichloronitrobenzene.

Like products are also obtained by treating with agents capable of introducing the residues of the aliphatic or hydroaromatic acids hereinbefore referred to the sulphonic acids of ortho- or peri-diamines, in which one amino-group may be substituted by an alkyl, aralkyl or aryl residue.

The manufacture and application of the new textile assisting agents can be illustrated by the following examples, the parts being by weight:—

Example 1

Into 50 parts of chlorosulphonic acid there are gradually introduced, while stirring, at 10° C. 25 parts of $\mu$-heptadecyl-benzimidazole, and the mixture is stirred at 20–25° C. until a sample of the mass dissolves clearly in dilute sodium carbonate solution, which generally occurs after 20–30 hours.

The mass is stirred into saturated common salt solution, cooled in ice; the sulphonated product separates in the form of a mass which solidifies in a short time. This mass is freed from liquid by suction.

The product thus obtained is suspended in hot water and neutralized by addition of caustic soda solution whereby a clear solution is obtained having a strong tendency to foam; on evaporating the solution the sodium salt of μ-heptadecyl-benzimidazolesulphonic acid is obtained.

This salt which very probably corresponds to the formula

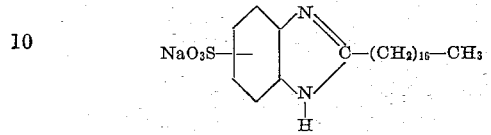

dissolves easily in hot water and forms a solution having a strong tendency to foam and pronounced properties in assisting washing, wetting and dispersion.

The same product is obtained if the sulphonation is conducted with oleum instead of with chlorosulphonic acid. For instance, 178 parts of μ-heptadecyl-benzimidazole are heated to 100–120° C. and the melt is gradually allowed to run into 356 parts of sulphuric acid monohydrate having a temperature of 10–30° C. 170 parts of oleum (containing 24 per cent. of $SO_3$) are cautiously added at a temperature of 5–10° C. and the mixture is stirred at this temperature until a sample dissolves clearly in aqueous alkali solutions. The reaction mass is then poured on to ice and the sulphonic acid which precipitates is separated by filtration, washed and further worked up in the manner described above.

The products so obtained may if necessary be bleached by treatment with an oxidizing agent, such as a hypochlorite, hydrogen peroxide or a permanganate.

*Example 2*

Into 75 parts of chlorosulphonic acid, cooled to 5–10° C. and stirred, are introduced gradually 25 parts of μ-undecyl-benzimidazole; the mixture is stirred at 20–25° C. until a sample dissolves clearly in dilute sodium carbonate solution. The product is then worked up as described in Example 1. The sodium μ-undecyl-benzimidazolesulphonate thus obtained which very probably corresponds to the formula

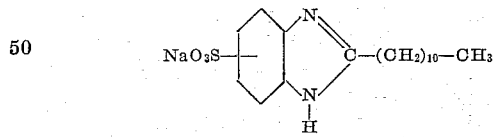

yields with soft or hard water a solution having a strong tendency to foam and of remarkable washing capacity.

*Example 3*

30 parts of a mixture of μ-naphthenyl-benzimidazoles are added gradually at 10–20° C. to 90 parts of chlorosulphonic acid and the mixture is stirred until a sample dissolves clearly in sodium carbonate solution; by working up the product as described in Example 1 there is obtained a mixture of μ-naphthenyl-benzimidazole-sulphonic acid salts in the form of a product easily soluble in water, which is a remarkable wetting and washing agent. This product corresponds very probably to the general formula

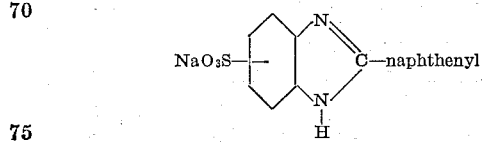

*Example 4*

In 300 parts of sulphuric acid monohydrate there are dissolved at 10–20° C. 100 parts of μ-heptadecenyl-benzimidazole, made by condensation of oleic acid with ortho-phenylene-diamine. The solution is cooled to 5° C., 150 parts of oleum of 24 per cent. strength are added drop by drop at 0–5° C. and the whole is stirred at this temperature until a sample dissolves completely in aqueous alkali solutions. After working up in the usual manner, such as is described in Example 1, there is obtained a product whose sodium salt very probably corresponds to the formula

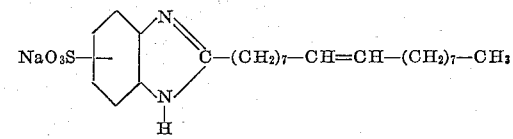

and whose solutions have a tendency to foam and have pronounced properties of assisting washing and wetting.

Similar compounds are obtained if there is used a mixture of imidazoles obtained by condensation of an aromatic ortho- or peri-diamine with a mixture of fatty acids, such as the fatty acids of coconut oil, palm oil, hard fat, soya oil, earthnut oil, bone fat, and so on.

*Example 5*

1.84 parts of ortho-aminodiphenyl amine and 2.84 parts of stearic acid are fused together and the melt is maintained at 200° C. for 20 hours whilst access of air is prevented. Advantageously the last residues of water formed in the reaction are expelled by passing a current of dry carbondioxide through the reaction vessel. The melt thus obtained, consisting of μ-heptadecyl-N-phenyl-benzimidazole may be sulphonated in the following manner, either directly or after recrystallization from alcohol and decolorization:

1 part of μ-heptadecyl-N-phenyl-benzimidazole is dissolved in two parts of sulphuric acid monohydrate at 10° C. whilst well stirring. 1 part of oleum of 60–65 per cent. strength is then run in at 5° C. so gradually that the temperature does not rise above 5° C. After addition of the oleum, the whole is stirred at the aforesaid temperature until a sample dissolves in water to a clear solution.

The sulphonation product is worked up in the usual manner. There is obtained the sodium salt of the sulphonated μ-heptadecyl-N-phenyl-benzimidazole of the probable formula

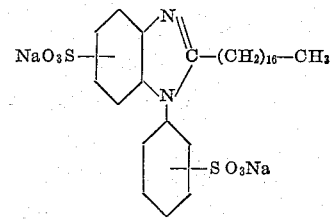

in the form of a powder which dissolves freely in water to solutions which foam strongly and have a remarkable capacity for promoting washing.

*Example 6*

1.98 parts of N-benzyl-ortho-phenylene-diamine and 2.84 parts of stearic acid are melted together and the melt is maintained at 200° C. for 20 hours whilst access of air is prevented. Advantageously the last residues of the water formed in the reaction are removed by passing a current of dry carbon-dioxide through the reaction vessel. The melt thus obtained, consisting of µ-heptadecyl-N-benzyl-benzimidazole may be sulphonated in the following manner, either directly or after suitable purification:

1 part of molten µ-heptadecyl-N-benzyl-benzimidazole is allowed to run gradually into 1 part of sulphuric acid monohydrate, whilst stirring and cooling in such a manner that the temperature of the mixture does not exceed 10° C. As soon as the addition is completed, and a homogeneous viscous mass has been formed, the mass is cooled to 0° C. and 1 part of oleum of 60-65 per cent. strength is slowly run in so that the temperature does not exceed 5° C. After addition of the oleum, the whole is further stirred at the aforesaid temperature until a sample dissolves clearly in water; this requires from 1-2 hours.

The sulphonation mass is then poured on to ice and the whole is neutralized with caustic soda solution and evaporated to dryness. There is obtained the sodium salt of the sulphonated µ-heptadecyl-N-benzyl-benzimidazole of the probable formula

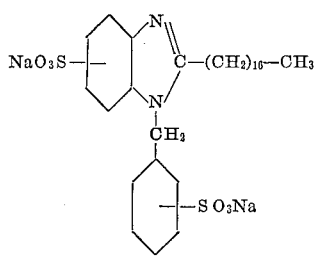

in the form of a powder which dissolves freely in water and whose solutions have remarkable washing properties.

*Example 7*

20 parts of µ-heptadecyl-1:2-naphthimidazole (made by condensation of 1:2-naphthylene-diamine with stearic acid) are introduced into 100 parts of sulphuric acid monohydrate, whilst stirring, whereupon the solution so obtained is heated for 16 hours on the water bath. The sulphonation mixture, which is scarcely colored, is stirred into 200 parts of ice and the sulphonic acid which precipitates is filtered through clay and for further purification washed with a saturated solution of common salt.

A solution of the neutralized acid has a strong capacity for foaming and a remarkable effect in promoting washing and dispersion. The new acid corresponds very probably to the formula

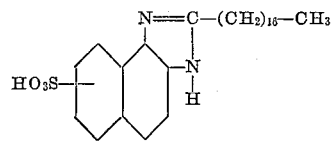

*Example 8*

1.08 parts of ortho-phenylene-diamine and 2.84 parts of stearic acid are melted together and the melt is maintained at 200° C. for 20 hours, advantageously with exclusion of air. In order to remove the last traces of moisture a current of dry carbon dioxide or nitrogen is passed through the reaction vessel above the melt. The melt is then allowed to cool to 100° C., 1.14 parts of benzyl-chloride and 0.82 part of anhydrous sodium acetate are added whilst well stirring and the whole is heated for 3 hours at 100-120° C. whilst stirring is continued. The temperature is then raised to 200° C. in order to expel the acetic acid and other by-products which have been formed. For facilitating the distillation of the volatile products it is advantageous to evacuate the reaction vessel.

Instead of sodium acetate there may be used another agent which binds acid, such as anhydrous sodium carbonate or calcium carbonate.

After all volatile constituents have been distilled from the melt at 200° C., the latter is allowed to cool without stirring, whereupon the sodium chloride formed settles to the bottom of the vessel; at a temperature of 50° C. the µ-heptadecyl-N-benzyl-benzimidazole of the formula

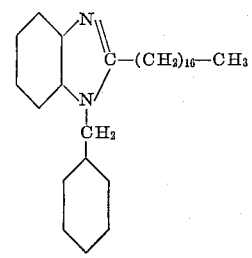

can easily be decanted in the form of a brownish oil, which may if required be decolorized by treatment with a suitable agent.

1 part of µ-heptadecyl-N-benzyl-benzimidazole made as above described is heated to 30-40° C., whereby it liquefies to a viscous oil which is then allowed to run slowly into 1 part of sulphuric acid monohydrate, whilst well stirring and cooling so that the temperature of the mixture does not exceed 10° C. After the addition is complete the viscous mixture is cooled to 0-5° C. and 1 part of oleum containing 60-65 per cent of $SO_3$ is slowly run in so that the temperature does not exceed 5° C. The sulphonation mixture is then further stirred at 5° C. until a sample dissolves clearly in water. The sulphonation mass is then worked up in the usual manner, for example by pouring it on ice, neutralizing it with caustic soda solution and evaporating to dryness. There is obtained a mixture of the sodium salt of sulphonated µ-heptadecyl-N-benzyl-benzimidazole whose formula very probably corresponds to the formula

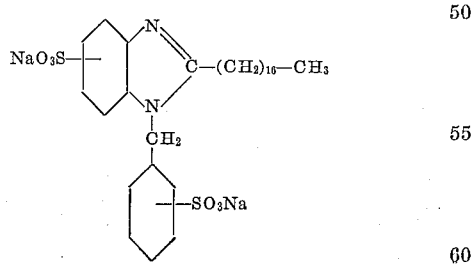

and sodium sulphate in the form of a powder which dissolves freely in water to form solutions having a strong tendency to foam and a remarkable capacity for promoting washing.

Instead of the benzyl chloride used in this example there may be used another fatty-aromatic, aliphatic or aromatic halogen-compound containing readily exchangeable halogen, such as derivatives of benzyl-chloride, chloromethyl-naphthalene and derivatives thereof, nitrated chlorobenzenes, allyl-chloride, halogen-alkyl sulphonic acids and others.

The products obtained may if necessary be bleached by treatment with an oxidizing agent, such as a hypochlorite, hydrogen-peroxide or a permanganate.

Example 9

100 parts of μ-heptadecyl-N-benzyl-benzimidazole made as described in Example 8 are fused at 100–120° C. and the melt is allowed to run slowly into 100 parts of monohydrate at 10–30° C. whilst stirring. 50 parts of tetrachlorethane are then added, the whole is stirred for a short time, then cooled to 0–5° C. and sulphonated at this temperature by means of 100 parts of oleum of 60–65 per cent. strength. By working up the sulphonation mixture in the manner described in Example 8 there is obtained a light colored pulverulent sulphonate which dissolves both in alcoholic and in aqueous acid media with the formation of solutions having a strong tendency to foam.

Instead of using tetrachlorethane as a diluent for the sulphonation there may be used another suitable diluent, such as trichloroethylene. It is also possible to proceed by first dissolving the μ-heptadecyl-N-benzyl-benzimidazole in tetrachlorethane and then sulphonating it according to known methods.

If necessary the products may be bleached by treatment with an oxidizing agent.

Example 10

From 100 parts of a technical mixture of stearic and palmitic acids and 41 parts of ortho-phenylene-diamine there is prepared, in the manner described in Example 8, a mixture of pentadecyl- and heptadecyl-benzimidazole. This mixture is allowed to cool to 140–120° C., whereupon 46 parts of benzyl-chloride are gradually added. After the mixture has been stirred for 6 hours at 140–150° C., the temperature is raised to 170° C. and stirring is continued for a further 6 hours. The reaction mixture containing the hydrochloride of the benzylated imidazoles is subjected to sulphonation in the manner described in Example 9, whereby there is likewise obtained a product having a remarkable capacity for promoting washing. The mixture of imidazole sulphonic acids corresponds to the formula

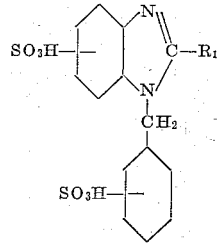

wherein $R_1$ simultaneously means heptadecyl and pentadecyl radicles. The temperature at which the benzylation is conducted may be varied within wide limits.

Example 11

100 parts of μ-heptadecenyl-benzimidazole are stirred at 140–145° C. and 36 parts of benzyl-chloride are added drop by drop; the whole is then maintained for about 10 hours at the aforesaid temperature and is then cooled to about 100° C. At the last named temperature 100 parts of the benzylated product thus obtained are allowed to run slowly into 300 parts of sulphuric acid monohydrate at 10–20° C. The mixture is then cooled to 5° C., 150 parts of oleum of 60–65 per cent. strength are gradually added at 0–5° C. and the mixture is stirred at this temperature until a sample dissolves in water to a completely clear solution. By working up the mixture in the manner described in Example 8 there is obtained a light colored pulverulent sulphonate, which dissolves in water to form solutions having a strong tendency to foam.

Similar products are obtained from the benzylated imidazoles prepared from aromatic ortho-diamines and the fatty-acids of coconut oil or palm oil or other mixtures of fatty acids.

Example 12

241 parts of the mixture of benzylated-benzimidazole hydrochlorides made as described in Example 10 are melted at 120–125° C. and there are added to the melt gradually and whilst stirring 60 parts of finely powdered anhydrous sodium carbonate and, when evolution of carbon dioxide has ceased, 70 parts of benzyl-chloride. The mixture is then stirred for 6–10 hours at 125° C. and then allowed to cool.

For purifying the product, the crude reaction mass is filtered whilst still molten in order to remove sodium carbonate and other inorganic constituents and the solidified filtrate is extracted with an organic solvent, such as benzene, in order to remove any parent materials which may still be present. There is thus obtained the quaternary ammonium salt of the benzylated-benzimidazoles of the formula:

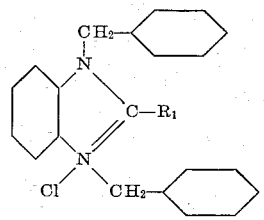

in which $R_1$ represents heptadecyl or pentadecyl radicles. The product is a colorless crystalline powder which is soluble in hot water to a solution having a strong tendency to foam.

If instead of benzylchloride there is used an equi-molecular quantity of 2,4-dichloro-1-nitro-benzene a similar product is obtained. It is also possible to convert the μ-heptadecyl-benzimidazole, by the action of dimethylsulphate in presence of sodium carbonate, into a quaternary methylated ammonium salt which is soluble in water to solutions having a tendency to foam, and has also the property of precipitating dyestuffs from their solutions. The products named in this example are useful for rendering fast to water dyeings produced on natural or regenerated cellulose by means of direct dyestuffs.

Example 13

40 parts of the mixture of benzylated benzimidazole hydrochlorides obtained as described in Example 10 and 200 parts of a sodium carbonate solution of 10 per cent. strength are stirred together at about 50° C. until there is precipitated a brownish oil. The oil is separated from the aqueous layer, washed with water until the washings no longer show an alkaline reaction and dried at 40–90° C. under reduced pressure. 25 parts of the product thus obtained are introduced into 50 parts of oleum (containing 24 per cent. of $SO_3$) at 0–5° C. and the mixture is stirred at 0° C. until a sample is completely soluble in water. The reaction product is worked up in the manner described in Example 8.

What I claim is:—

1. Process for the production of sulphonic acids, consisting in treating with sulphonating agents cyclic amidines of the general formula

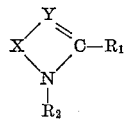

wherein Y stands for a nitrogen atom which, due to the addition of a compound of the type halogen-Z, in which Z means alkyl or benzyl, may be present in the form of the pentavalent nitrogen atom of a quaternary ammonium compound, X stands for a ring of the benzene or naphthalene series which, by means of two vicinal carbon atoms, is directly linked to the nitrogen atoms Y and N, $R_1$ stands for an aliphatic radicle consisting itself of at least 3 carbon atoms, and $R_2$ stands for hydrogen, alkyl, benzyl or a ring of the benzene series.

2. Process for the production of sulphonic acids, consisting in treating with sulphonating agents cyclic amidines of the general formula

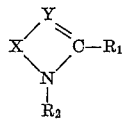

wherein Y stands for a nitrogen atom which, due to the addition of a compound of the type halogen-Z, in which Z means alkyl or benzyl, may be present in the form of the pentavalent nitrogen atom of a quaternary ammonium compound, X stands for a ring of the benzene or naphthalene series which, by means of two vicinal carbon atoms, is directly linked to the nitrogen atoms Y and N, $R_1$ stands for a aliphatic radicle consisting itself of at least 8 carbon atoms, and $R_2$ stands for hydrogen, alkyl, benzyl or a ring of the benzene series.

3. Process for the production of sulphonic acids, consisting in treating with sulphonating agents cyclic amidines of the general formula

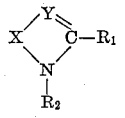

wherein Y stands for a nitrogen atom which, due to the addition of a compound of the type halogen-Z, in which Z means alkyl or benzyl, may be present in the form of the pentavalent nitrogen atom of a quaternary ammonium compound, X stands for a ring of the benzene or naphthalene series which, by means of two vicinal carbon atoms, is directly linked to the nitrogen atoms Y and N, $R_1$ stands for a straight aliphatic chain consisting itself of at least 8 carbon atoms, and $R_2$ stands for hydrogen, alkyl, benzyl or a ring of the benzene series.

4. Process for the production of sulphonic acids, consisting in treating with sulphonating agents cyclic amidines of the general formula

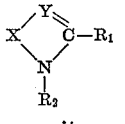

wherein Y stands for a nitrogen atom which, due to the addition of a compound of the type halogen-Z, in which Z means alkyl or benzyl, may be present in the form of the pentavalent nitrogen atom of a quaternary ammonium compound, X stands for a ring of the benzene or naphthalene series which, by means of two vicinal carbon atoms, is directly linked to the nitrogen atoms Y and N, $R_1$ stands for a straight, saturated aliphatic chain consisting itself of at least 8 carbon atoms, and $R_2$ stands for hydrogen, alkyl, benzyl or a ring of the benzene series.

5. Process for the production of sulphonic acids, consisting in treating with sulphonating agents cyclic amidines of the general formula $$X \diagup \!\!\!\!\!\! \underset{\underset{R_2}{|}}{N} \!\!\!\!\!\! \diagdown \!\!\!\!\!\! \overset{Y}{\underset{}{}} C - R_1$$

wherein Y stands for a nitrogen atom which, due to the addition of a compound of the type halogen-Z, in which Z means alkyl or benzyl, may be present in the form of the pentavalent nitrogen atom of a quaternary ammonium compound, X stands for a ring of the benzene or naphthalene series which, by means of two vicinal carbon atoms, is directly linked to the nitrogen atoms Y and N, $R_1$ stands for a straight, saturated aliphatic chain consisting itself of an odd number of carbon atoms lying between 10 and 18, and $R_2$ stands for hydrogen, alkyl, benzyl or a ring of the benzene series.

6. Process for the production of sulphonic acids, consisting in treating with sulphonating agents cyclic amidines of the general formula $$X \diagup \!\!\!\!\!\! \underset{\underset{R_2}{|}}{N} \!\!\!\!\!\! \diagdown \!\!\!\!\!\! \overset{Y}{\underset{}{}} C - R_1$$

wherein Y stands for a nitrogen atom, X stands for a ring of the benzene or naphthalene series which, by means of two vicinal carbon atoms, is directly linked to the nitrogen atoms Y and N, $R_1$ stands for a straight, saturated aliphatic chain consisting itself of an odd number of carbon atoms lying between 10 and 18, and $R_2$ stands for hydrogen, alkyl, benzyl or a ring of the benzene series.

7. Process for the production of sulphonic acids, consisting in treating with sulphonating agents the imidazoles of the general formula wherein $R_1$ stands for a normal saturated aliphatic chain consisting of an odd number of carbon atoms lying between 10 and 18, and $R_2$ stands for hydrogen, alkyl, benzyl or a ring of the benzene series.

8. Process for the production of a sulphonic acid, consisting in converting the imidazole of the formula into a monosulphonic acid by treatment with sulphonating agents.

9. Process for the production of a sulphonic acid, consisting in converting the imidazole of the formula

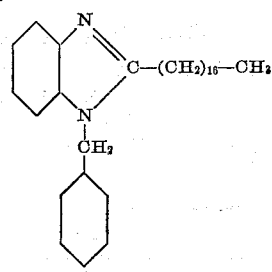

into a disulphonic acid by treatment with sulphonating agents.

10. The sulphonic acids of cyclic amidines of the general formula

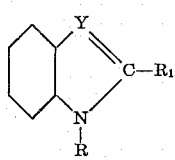

wherein Y stands for a nitrogen atom which, due to the addition of a compound of the type halogen-Z, in which Z means alkyl or benzyl, may be present in the form of the pentavalent nitrogen atom of a quaternary ammonium compound, $R_1$ stands for a straight saturated aliphatic chain consisting itself of an odd number of carbon atoms lying between 10 and 18, and $R_2$ stands for hydrogen, alkyl, benzyl or a ring of the benzene series, which products form with alkalies salts which dissolve in water to form solutions having strong capillary active properties.

11. The monosulphonic acids of cyclic amidines of the general formula

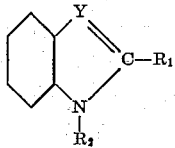

wherein Y stands for a nitrogen atom which, due to the addition of a compound of the type halogen-Z, in which Z means alkyl or benzyl, may be present in the form of the pentavalent nitrogen atom of a quaternary ammonium compound, $R_1$ stands for a straight saturated aliphatic chain consisting itself of an odd number of carbon atoms lying between 10 and 18, and $R_2$ stands for hydrogen, alkyl, benzyl or a ring of the benzene series, which products form with alkalies salts which dissolve in water to form solutions having strong capillary active properties.

12. The sulphonic acids of cyclic amidines of the general formula

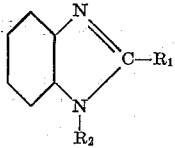

wherein $R_1$ stands for a straight saturated aliphatic chain consisting of an odd number of carbon atoms lying between 10 and 18, and $R_2$ stands for hydrogen, alkyl, benzyl or a ring of the benzene series, which products form with alkalies salts which dissolve in water to form solutions having strong capillary active properties.

13. The monosulphonic acids of the cyclic amidines of the general formula

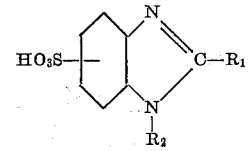

wherein $R_1$ stands for a straight saturated aliphatic chain consisting of an odd number of carbon atoms lying between 10 and 18, and $R_2$ stands for hydrogen or alkyl, benzyl or a ring of the benzene series, which products form with alkalies salts which dissolve in water to form solutions having strong capillary active properties.

14. The monosulphonic acids of the $\mu$-heptadecyl-benzimidazole of the formula

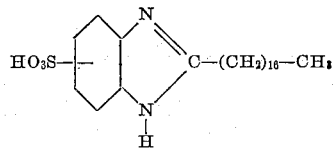

which products form with alkalies salts which dissolve in water to form solutions having strong capillary active properties.

15. The disulphonic acids of the cyclic amidines of the general formula

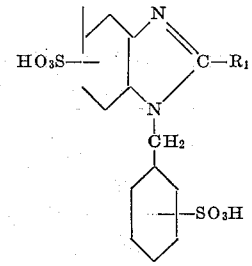

wherein $R_1$ stands for a straight saturated aliphatic chain consisting of 15 or 17 carbon atoms, which products form with alkalies salts which dissolve in water to form solutions having strong capillary active properties.

16. The disulphonic acids of the cyclic amidine of the general formula

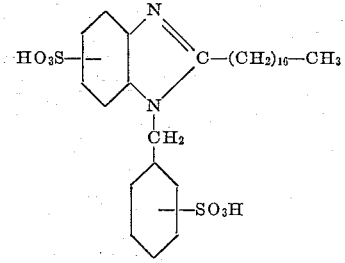

which products form with alkalies salts which dissolve in water to form solutions having strong capillary active properties.

CHARLES GRÄNACHER.